United States Patent
Johnson et al.

[15] 3,700,115

[45] Oct. 24, 1972

[54] VEHICLE WITH VARIABLE WIDTH GROUND SUPPORTS

[72] Inventors: Kenneth V. Johnson, Oconomowoc; David A. Miller, New Berlin, both of Wis.

[73] Assignee: Koehring Company, Milwaukee, Wis.

[22] Filed: Sept. 17, 1970

[21] Appl. No.: 73,014

[52] U.S. Cl.....................................212/38, 180/9.48
[51] Int. Cl................................................B66c 23/36
[58] Field of Search........................212/38; 180/9.48

[56] References Cited

UNITED STATES PATENTS

| | | |
|---|---|---|
| 2,634,663 | 4/1953 | Curtis..................180/9.48 X |
| 2,763,330 | 9/1956 | Potter......................180/9.48 |
| 3,205,961 | 9/1965 | Nolte.......................180/9.48 |
| 3,312,291 | 4/1967 | Haug...................180/9.48 X |
| 3,416,622 | 12/1968 | Helm et al............180/9.48 X |

Primary Examiner—Evon C. Blunk
Assistant Examiner—Merle F. Maffei
Attorney—Andrew J. Beck, Charles W. Walton and F. Kristen Koepcke

[57] ABSTRACT

An endless track vehicle such as a mobile construction machine comprising laterally adjustable tracks movable relative to the vehicle frame, pivotally connected arms interposed between the frame and tracks, and locking means for independently and releasably securing each track in various lateral positions relative to the vehicle frame.

6 Claims, 7 Drawing Figures

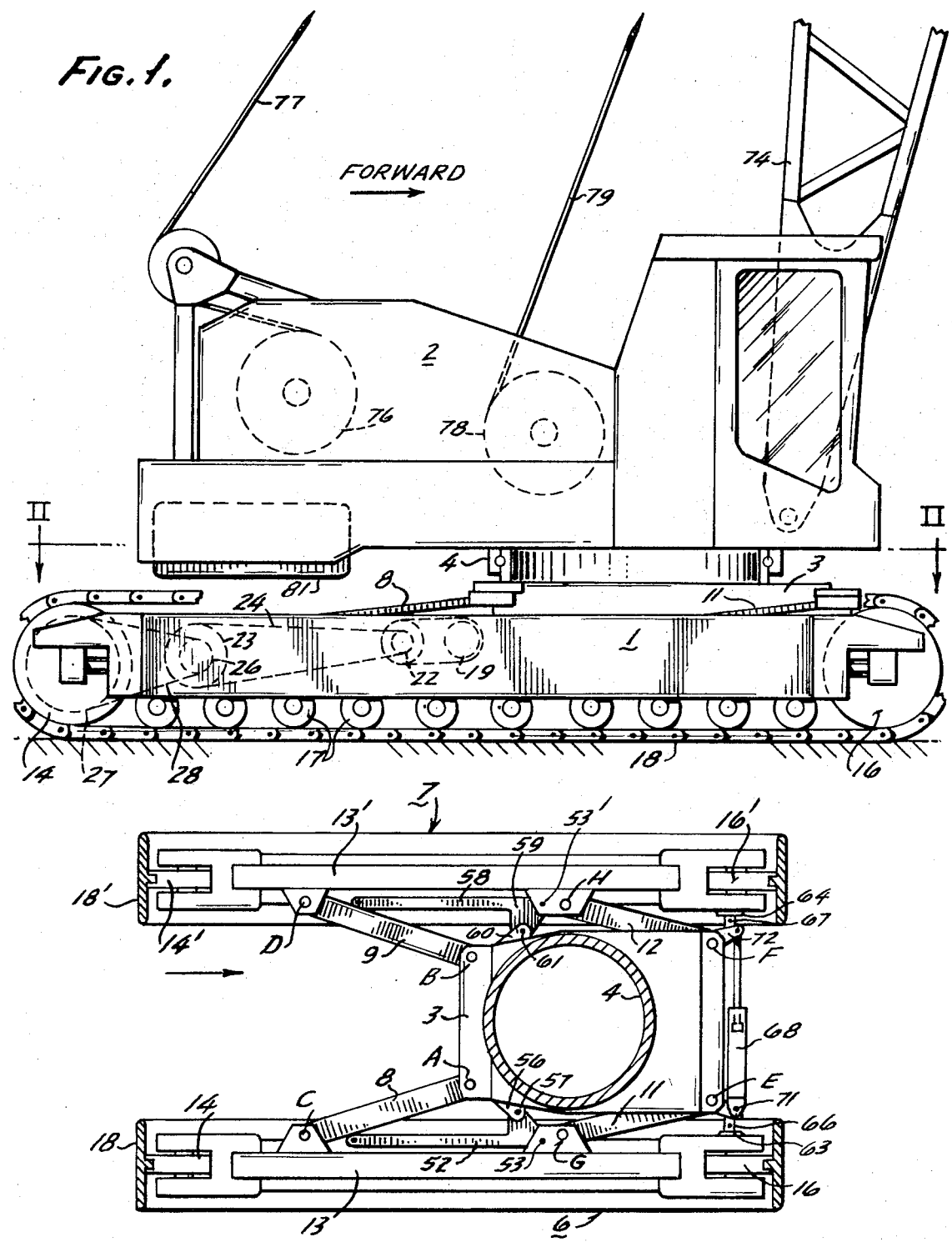

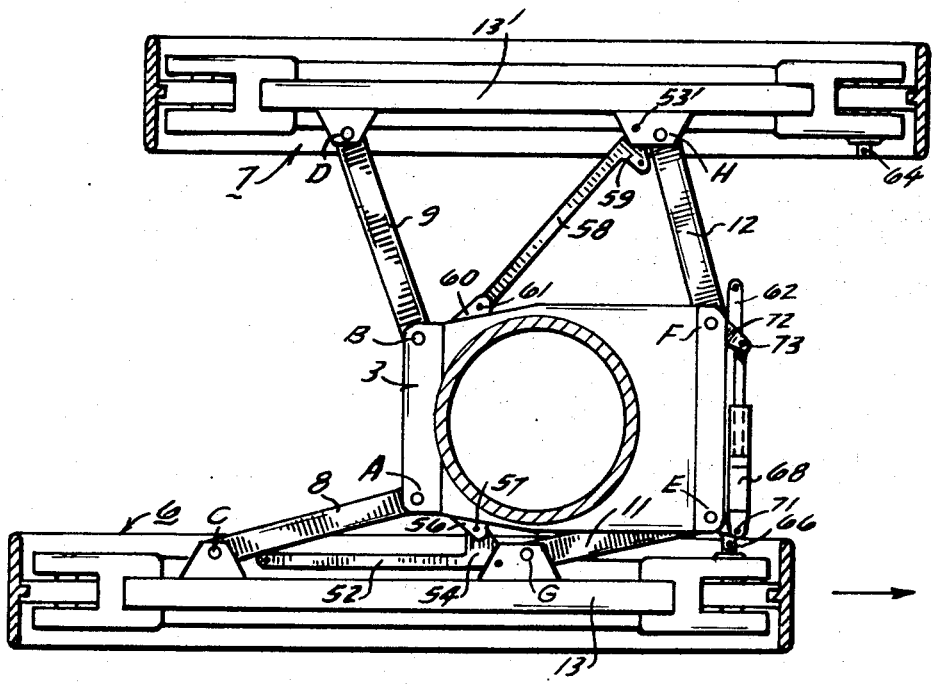
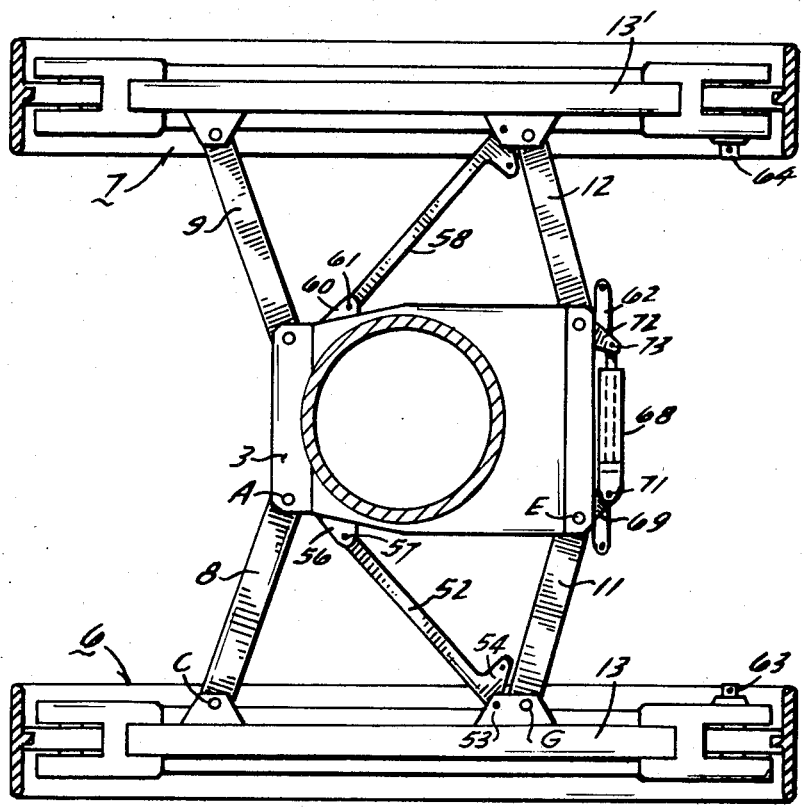

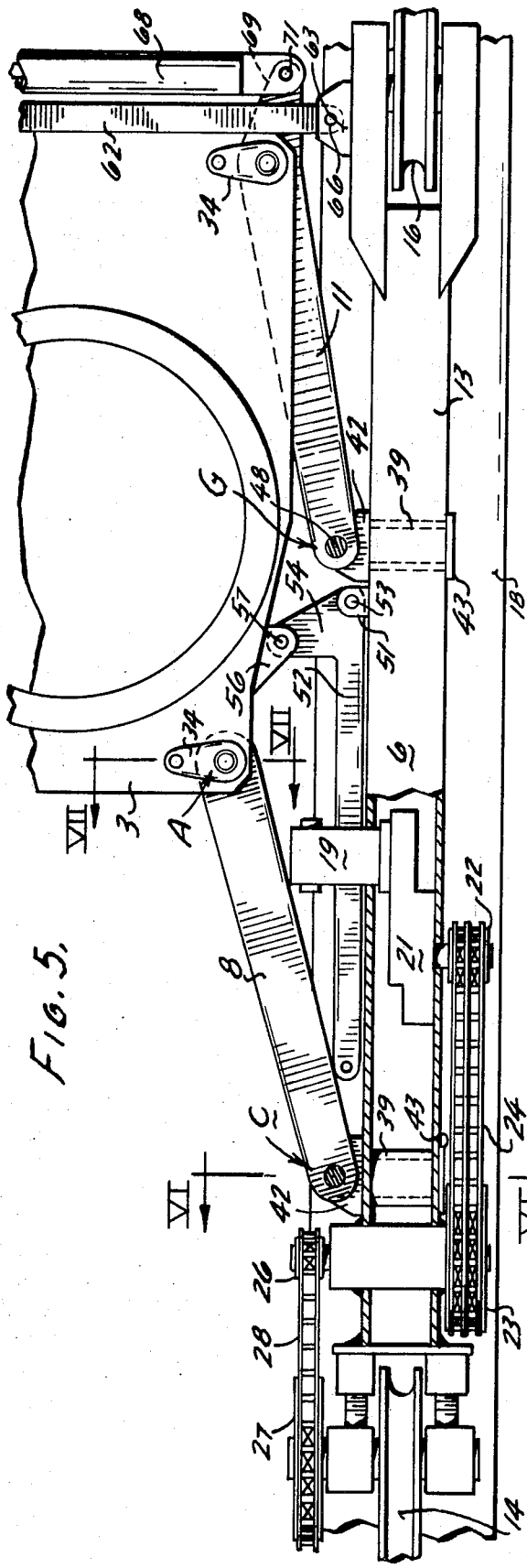

3,700,115

VEHICLE WITH VARIABLE WIDTH GROUND SUPPORTS

BACKGROUND OF THE INVENTION

The invention generally relates to wheeled and track vehicles of the type which are primarily intended as carriers for heavy equipment, such as cranes, excavators and similar material handling apparatus.

Heretofore in crawler cranes it has been recognized that an increased stability or lift capacity is attainable for cranes or the like with a relatively wide track spacing. However, such wide spacing poses transport problems particularly for large size cranes. Various attempts have been made to provide carriers or vehicles wherein the lateral spacing between the ground support elements could be made wider or narrower as needed for stability at the job site and for compactness during transport. Such devices have included, for example, rigid but removable spacers between the carrier and the track frames or, alternatively, telescopic slidable supporting beams mounted for lateral adjustment of the track frames relative to the carrier frame. However, these and other such devices have not been completely satisfactory in that they have been difficult to adjust, complicated and/or costly to manufacture.

BRIEF SUMMARY OF INVENTION

Generally, it is an object of the present invention to provide a variable track width crawler or wheeled vehicle that minimizes or circumvents the problems heretofore noted.

More specifically, it is an object of the present invention to provide an endless track carrier with a simple mechanism facilitating convenient lateral adjustment of the track placement relative to the carrier frame.

In achieving these and other objects, as will become apparent hereinafter, one embodiment of the present invention provides for a vehicle having a frame and a pair of laterally spaced and adjustable ground support elements supporting the frame. A plurality of arms pivotally connected to the frame and the ground support elements permit swinging lateral movement of the ground support elements relative to the frame and a locking device is provided for releasably securing the ground support elements relative to the frame.

BRIEF DESCRIPTION OF THE DRAWINGS

In describing the invention reference will be made to the accompanying drawings forming a portion of the instant disclosure wherein:

FIG. 1 is a fragmentary elevational view of a crawler crane provided with laterally adjustable crawler units according to the present invention;

FIGS. 2, 3 and 4 are plan views of the crawler crane shown in FIG. 1 and taken generally along line II — II therein showing the crawler units in various stages of laterally outward adjustment;

FIG. 5 is a fragmentary plan view, on an enlarged scale, of certain structural details of the crawler unit shown in FIG. 1;

FIG. 6 is an elevational side view, on an enlarged scale, partially in cross section, of the crawler unit shown in FIG. 5 and taken along lines VI — VI therein; and FIG. 7 is a fragmentary elevational side view of the crawler crane along lines VII — VII of FIG. 5 showing in detail an arm linkage pivotally connected to the frame according to the present invention.

DETAILED DESCRIPTION OF INVENTION

Referring in more detail to FIG. 1 of the drawing, a crane or mobile construction machine susceptable of use with the present invention, comprises a crawler type carrier generally designated by the reference character 1, and a rotary superstructure 2. A frame or chassis 3 of the carrier 1 mounts a large diameter ball bearing 4 by means of which the superstructure 2 is supported on the carrier 1 for rotation about a vertical axis in conventional manner.

Referring to FIG. 2, a pair of ground support elements, such as track crawler units 6 and 7, are disposed at opposite sides of the frame 3 and are connected in supporting and in variable tread spacing relation thereto by a pair of rearward side arms 8 and 9, and by a pair of forward side arms 11 and 12. The rearward side arms 8 and 9 are connected at their inner ends to transversely spaced rearward positions on opposite sides of the frame 3 by vertical axis pivot joints A and B for horizontal inward and outward swinging movement relative thereto. The outer ends of the rearward side arms 8 and 9 are connected by vertical axis pivot joints C and D to rearward portions of the crawler units 6 and 7, respectively.

As further shown in FIG. 2, the forward side arms 11 and 12 are connected at their inner ends to transversely spaced forward positions on opposite sides of the frame 3 by vertical axis pivot joints E and F for horizontal inward and outward swinging movement relative thereof. The outer ends of the forward side arms 11 and 12 are connected by vertical axis pivot joints G and H to forward portions of the crawler units 6 and 7, respectively.

The construction of the crawler unit 6 and associated side arms 8 and 11 are shown in detail in FIGS. 5 and 6. The track frame 13 of the unit comprises a generally rectangular hollow beam 13 which mounts a rearward track chain drive sprocket 14 and a forward track chain idler 16. A series of track rollers 17 (FIGS. 1 and 6) are mounted on the underside of the track frame 13 and bear upon an endless track chain 18 which is trained over the drive sprocket 14 and idler 16 as shown in FIG. 1.

The drive mechanism for the track chain drive sprocket 14 comprises a hydraulic motor 19; speed reducing gearing 21 connected to the motor 19 and having an output sprocket 22; a countershaft having a large chain sprocket 23 on the outside of the track frame connected with the output sprocket 22 by a drive chain 24; a small chain sprocket 26 secured to the countershaft at the inner side of the track frame 13; and a large chain sprocket 27 on the shaft of the track chain drive sprocket 14 connected to the chain sprocket by a drive chain 28. The motor 19 is connected with a source of fluid pressure on the superstructure 2 through flexible conduits, not shown.

The foregoing explanations of the crawler unit 6 analogously apply to the crawler unit 7. Like the crawler unit 6, the crawler unit 7 includes a hydraulic drive mechanism for its track chain drive sprocket 14' (FIG. 2). Forward and reverse drive of each track unit is controlled by conventional mechanism on the superstructure, so that either track unit can be driven in forward or reverse directions independently of the other.

The pivot joint A which connects the rearward side arm 8 with the frame 3 of the carrier is shown in detail in FIG. 7. It comprises an upper pivot pin 29 and a lower pivot pin 31 which connect upper and lower hinge lugs 32 and 33 of the side arm 8 with upper and lower hinge sockets on the carrier frame 3. Retainer plates 34 and 36 are welded to the pivot pins 29 and 31 and are secured to the carrier frame 3 by bolts 37 and 38.

The pivot joints B, E and of (FIG. 2) are constructed the same as the pivot joint A shown in FIG. 7.

The pivot joints C, G and D, H which connect the outer ends of the side arms 8, 11 and 9, 12 with the track frames 13 and 13' respectively, are each constructed as shown in FIG. 6. Referring to FIG. 6, a tubular trunnion 39 is telescopically fitted into a sleeve 41 which extends transversely through the track frame 13 and is secured thereto by welding. The trunnion 39 has a head 42 at the inner side of the track frame 13, and a retainer plate 43 is detachably secured to the trunnion at the outer side of the track frame 13 by capscrews 44. The trunnion head 42 is straddled by upper and lower hinge lugs 46, 47 of the side arm 8, and a hinge pin 48 connecting the lugs 46, 47 to the trunnion head 42 is removably secured to the latter by a through bolt 49. Removal of the retainer plates 43 from the trunnions of the pivot joints C and G (FIG. 5) releases the crawler unit 6 for lateral withdrawal from the trunnions 39. The crawler unit 7 is similarly constructed for lateral withdrawal, if desired, from the trunnions of the pivot joints D and H (FIG. 2).

Referring to FIG. 5, a pivot bracket 51 is secured to the inner side of the track frame 13 and extends therefrom toward the carrier frame 3 immediately in rear of the pivot joint G. The bracket 51 mounts a link 52 on a vertical pivot pin 53 on which it may swing into a position parallel to the track frame 13 as shown in FIGS. 2 and 5, and into an oblique position as shown in FIG. 4. The link 52 has a long arm and a short arm 54 which is integrally connected with the pivoted end of the long arm and extends horizontally from the side of the latter next to the carrier frame 3. In the position of the link 52 as shown in FIG. 5, the free end of the short arm 54 mates with a side lug 56 of the carrier frame 3, and a vertical coupling pin 57 extends through aligned holes in the lug 56 and arm 54.

A link 58 (FIG. 2) which is an opposite hand duplicate of the link 52, is connected to the track frame 13' of the crawler unit 7 by means of a vertical pivot pin 53' on which it may swing into a position parallel to the track frame 13' as shown in FIG. 2, and into an oblique position as shown in FIG. 3. Like the link 52, the link 58 has a short arm 59 for connection to a side lug 60 of the carrier frame 3 by means of a coupling pin 61.

Referring again to FIG. 5, the carrier frame 3 has a cross bar 62 at its front end, the full length of the bar 62 being best shown in FIG. 4. The opposite ends of the bar 62 provide laterally extending coupling elements on the carrier frame 3 at opposite sides of the latter and spaced lengthwise thereof from the side lugs 56 and 60, respectively. As also shown in FIG. 4, a coupling lug 63 is secured to the front end of the track frame 13, and another coupling lug 64 is secured to the front end of the track frame 13'. In the narrow tread position of the crawler units 6 and 7 as shown in FIG. 2, the coupling lugs 63, 64 mate with the adjacent ends of the cross bar 62. A vertical coupling pin 66 extends through alined holes in the coupling lug 63 and the adjacent end of the cross bar 62. Another vertical coupling pin 67 extends through alined holes in the coupling lug 64 and the adjacent end of the cross bar 62.

When the crane is to be transported to or from a job site, as on a platform trailer or flat car, the crawler units 6 and 7 should be in the narrow tread positions in which they are shown in FIG. 2, and the rearward coupling pins 57, 61 and the forward coupling pins 66, 67 should be in place so as to retain the crawler units in locked positions on the carrier frame 3.

Upon unloading of the crane with its crawler units 6 and 7 in narrow tread positions, lateral outward adjustment of the crawler units 6 and 7 to their wide tread positions may be effected in two stages as follows. First, the crawler unit 7 is unlocked by withdrawal of the coupling pins 61 and 67. Forward driving power in the direction of the arrow in FIG. 2 is then applied to the unlocked crawler unit 7 while braking force is applied through the hydraulic motor 19 to the locked crawler unit 6. During the resulting veering of the crane to the right the side arms 9 and 12 swing from the positions in which they are shown in FIG. 2 to the positions in which they are shown in FIG. 3. This automatically places the crawler unit 7 into its wide tread position. The link 58 is then connected at the free end of its long arm to the side lug 60 by reinsertion of the coupling pin 61. The link then serves as a brace to lock the crawler unit 7 in its wide tread position.

For the second stage of the tread adjusting operation which brings the crawler unit 6 from the narrow tread position in which it is shown in FIG. 3 to its wide tread position in which it is shown in FIG. 4, the track unit 6 is first unlocked by withdrawal of the coupling pins 57 and 66. Forward driving power in the direction of the arrow in FIG. 3 is then applied to the unlocked crawler unit 7 while braking force is applied through the hydraulic motor on the track frame 13' to the locked crawler unit 7 in its wide tread position. During the resulting veering of the crane to the left the side arms 8 and 11 swing from the positions in which they are shown in FIG. 3 to the positions in which they are shown in FIG. 4. This automatically places the crawler unit 6 into its wide tread position as shown in FIG. 4. The link 52 is then connected at the free end of its long arm to the side lug 56 by reinsertion of the coupling pin 57. The link then serves as a brace to lock the crawler unit 6 in its wide tread position.

The foregoing explanations of the tread widening operation analogously apply to the tread narrowing operation. That is, the crawler unit 7 may be moved back from its wide tread to its narrow tread position by first unlocking the link 58 from the side lug 60 and then driving the crawler unit 7 in reverse while braking the drive of the crawler unit 6 in its wide tread position. Thereafter, the crawler unit 6 may be moved back from its wide tread to its narrow tread position by first unlocking the link 52 from the side lug 56 and then driving the crawler unit 6 in reverse while braking the drive of the crawler unit 7 in its narrow tread position.

The cross bar 62 and associated coupling lugs 63, 64 and pins 66, 67, together with the links 52, 58, their short arms 54, 59, and coupling pins 57, 61 provide separable lockup means operatively interposed between the carrier frame 3 and track frames 13, 13' for releasably securing the latter independently of each other in laterally adjusted positions relative to the carrier frame 3.

While the tread adjusting operation may be effected automatically by the hereinabove described selective forward and reverse driving of the crawler units, the lateral in and out movement of the crawler units 6 and 7 may be assisted or expedited by a double acting hydraulic ram 68 at the forward end of the carrier frame 3. As best shown in FIG. 5, the rod end of the ram 68 is connected to an angular extension 69 of the side arm 11 by means of a vertical pivot pin 71. The piston rod of the ram 68, as shown in FIGS. 2, 3 and 4, is connected to an angular extension 72 of the side arm 12 by means of a pivot pin 73. Fluid lines, not shown, connect the rod and cylinder ends of the ram 68 with a pressure fluid supply system suitably mounted on and connected to the vehicle.

In the narrow tread condition of the crane as shown in FIG. 2 the ram 68 is fully extended. Admission of pressure fluid into the cylinder and of the ram 68 during the first stage of the hereinabove described tread widening operation urges the crawler unit 7 laterally away from the carrier frame 3; and continued admission of pressure fluid into the cylinder end of the ram 68 during the second stage of the tread widening operation urges the crawler unit 6 away from the carrier frame 3. Conversely, admission of pressure fluid into the rod end of the ram 68 during the first stage of the hereinabove described tread narrowing operation urges the crawler unit 7 laterally toward the carrier frame 3; and continued admission of pressure fluid into the rod end of the ram 68 during the second stage of the tread narrowing operation urges the crawler unit 6 laterally toward the carrier frame 3.

The ram 68 and its connections with the side arms 11 and 12 afford power operated actuating means whereby the track frames 13 and 13' of the crawler units 6 and 7 may be selectively urged laterally toward or away from the carrier frame 3 independently of each other.

Referring to FIG. 1, the superstructure 2 includes a pivotally up and down adjustable boom 74; a derricking winch 76 and cable 77 for raising and lowering the boom 74; a hoist 78 and load line 79, and a counterweight 81, all in conformity with conventional practice. Preparatory to the hereinabove described tread widening operation the boom 74 is preferably raised to its most elevated position, and the superstructure 2 is rotated on the carrier 1 into a position in which the counterweight 81 overlies the crawler unit 6. Such rotary adjustment of the superstructure 2 shifts the center of gravity of the crane toward one side, that is, toward the crawler unit which, during the first stage of the tread widening operation, remains locked, and away from the crawler unit which, during the first stage of the tread widening operation is moved laterally outward. This is desirable because it lightens the load on the laterally moving crawler unit and at the same time increases the load, and consequently the ground grip of the locked crawler unit.

For the second stage of the tread widening operation the center of gravity will obviously be shifted toward the outwardly adjusted crawler unit by appropriate rotation of the superstructure 2.

The described weigh shifting principle may, of course, also be employed for the tread narrowing operation. Upward adjustment of the boom 74 to its most elevated position for obtaining a maximum weight shift has the further advantage that it reduces the ground space required for the performance of the tread widening and tread narrowing operations.

In summary, it should be appreciated by one skilled in the art that the present invention provides a conveniently usable track adjusting device for enhancing the stability or increasing the lift capacity of crawler or wheeled-type vehicles. In the disclosed embodiment tracks may be adjusted independently or simultaneously relative to the frame with or without independent actuating devices. Additionally, the tracks and frame are conveniently fixed in either their wide or narrow stance positions by a simple pin and linkage locking device.

It will be apparent that various details of the illustrated form of the present invention may be varied without departing from the inventive concept. It will accordingly be understood that it is intended to embrace within the scope of this invention such modifications as may be embraced by the skill of the art.

Having thus described my invention, what we claim as new and desire to secure by Letters Patent in the United States, is:

1. A mobile construction machine having a superstructure including a vertically pivotal boom, the machine comprising:
   a chassis for supporting the superstructure;
   first and second ground support means for supporting said chassis on opposite sides thereof;
   each of said ground support means including a ground support and arm means pivotally connected to and interposed between said chassis and said ground support for pivotal movement about a generally vertical axis for adjusting relative positions of said chassis and said ground support;
   separable first locking means operatively interposed between said chassis and each of said ground support means for releasably securing the latter independently of each other in laterally adjusted narrow and wide tread positions relative to said chassis; and
   second locking means operatively interposed between said chassis and each of said ground support means for securing the latter independently of each other in a laterally adjusted narrow tread position, said second locking means comprising,
   a cross bar fixedly connected to said chassis, and
   first and second side lugs connected respectively to said first and second ground supports wherein said cross bar is selectively connectable to either of said side lugs.

2. A machine according to claim 1 and further comprising:

power operated actuating means having ends thereof connected, respectively, between said arm means connecting each of said ground supports to said chassis for at least assisting adjustment of said ground support relative to said chassis from a narrow to a wide tread position.

3. A mobile construction machine having a superstructure including a vertically pivotally adjustable boom, the machine comprising:

a chassis for supporting the superstructure;

a pair of ground support means for supporting said chassis on opposite sides thereof;

arm means pivotally connected to and interposed between said chassis and each of said ground support means for pivotal movement about a generally vertical axis for adjusting relative positions of said chassis and said ground support means; and locking means independent of said arm means including, side lugs at opposite sides of said chassis, and a link connected between each of said ground support means and said chassis, said links pivoted respectively, on said ground support means and each having a long arm and an integral short arm, and coupling means alternately operable to connect said short arm to said side lugs upon adjustment of said ground support means to narrow tread positions and to connect said long arms to said side lugs upon adjustment of said ground support means to wide tread positions for releasably securing said support means and said chassis relative to each other.

4. A mobile construction machine having a superstructure including a vertically pivotally adjustable boom, the machine comprising:

a chassis means for supporting the superstructure;

a pair of ground support means for supporting said chassis means on opposite sides thereof;

arm means pivotally connected to and interposed between said chassis means and each of said ground support means for pivotal movement about a generally vertical axis for adjusting relative positions of said chassis means and said ground support means; and locking means independent of said arm means including, side lugs on said chassis means and said ground support means, and a link connected between said side lugs on each of said ground support means and said chassis means, said links being pivotally mounted on the side lugs of one of said chassis means and said ground support means and each link having a long arm and an integral short arm, and coupling means alternatively operable to connect said short arm to said side lugs on the other of said chassis means and said ground support means upon adjustment of said ground support means to narrow tread positions and to connect said long arms to said side lugs on the other of said chassis means and said ground support means upon adjustment of said ground support means to wide tread positions for releasably securing said support means and said chassis means relative to each other.

5. A machine according to claim 1 wherein each of said ground supports comprises a crawler unit including endless track means.

6. A machine according to claim 3 further comprising power means interconnecting certain of said arm means for one of said ground support means with certain of said arm means for the other of said ground support means.

* * * * *